(No Model.)
A. D. & C. J. GRUBB.
STOVEPIPE COLLAR AND FASTENER.
No. 483,441. Patented Sept. 27, 1892.
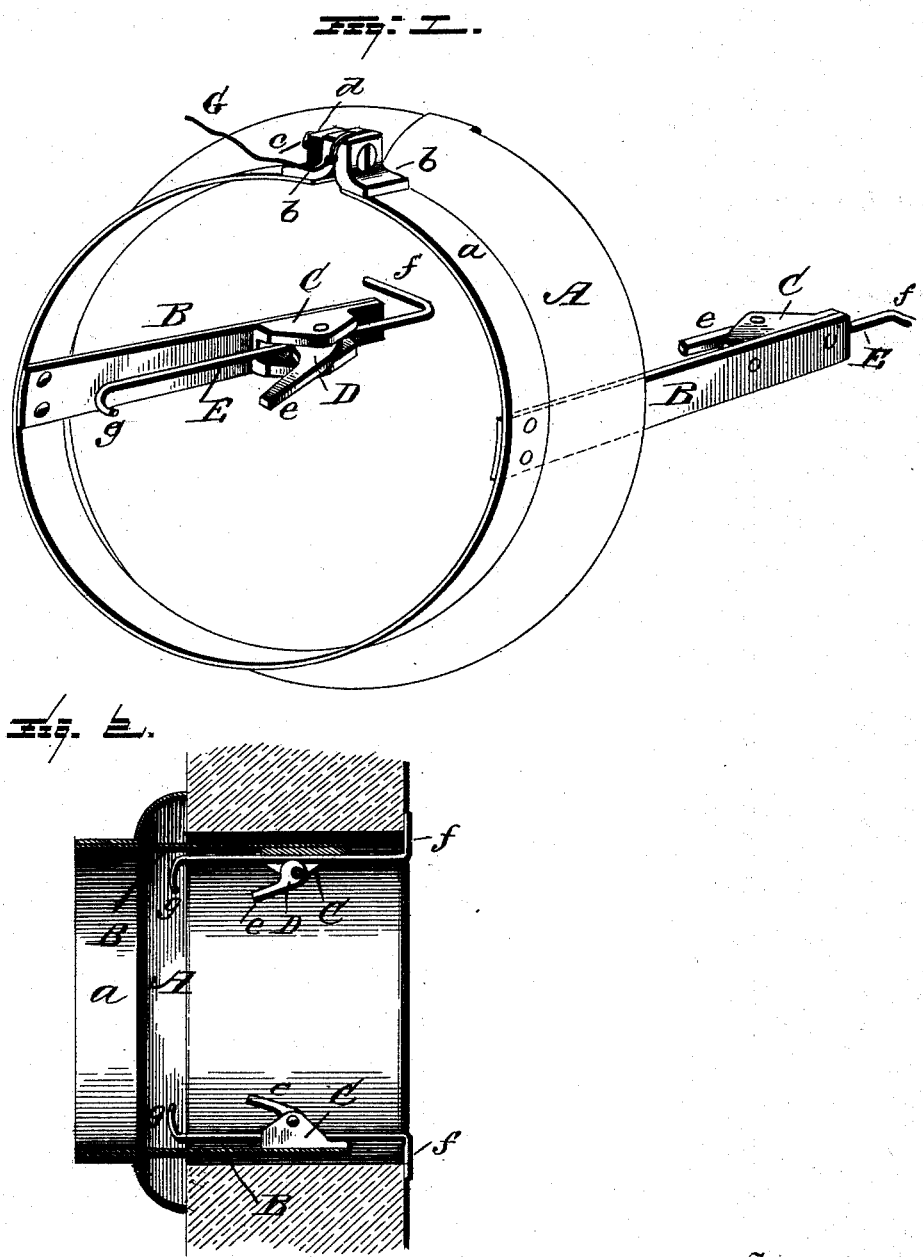
Witnesses
L. C. Hills
Wm Grant
Inventors
Arthur D. Grubb,
Charles J. Grubb,
per Chas. H. Foesler
Attorney

UNITED STATES PATENT OFFICE.

ARTHUR DAVID GRUBB AND CHARLES JONAS GRUBB, OF HAMILTON, ILLINOIS.

STOVEPIPE COLLAR AND FASTENER.

SPECIFICATION forming part of Letters Patent No. 483,441, dated September 27, 1892.

Application filed May 10, 1892. Serial No. 432,438. (No model.)

*To all whom it may concern:*

Be it known that we, ARTHUR DAVID GRUBB and CHARLES JONAS GRUBB, citizens of the United States, residing at Hamilton, in the county of Hancock and State of Illinois, have invented certain new and useful Improvements in Stovepipe Collars and Fasteners; and we do hereby declare that the following is a full, clear, and exact description of the same, reference being had to the annexed drawings, making a part of this specification, and to the letters of reference marked thereon.

Figure 1 of the drawings represents a perspective view of the improved stovepipe collar and fastener; Fig. 2, a sectional elevation showing the device in position around the chimney-flue.

The present invention has relation to that class of devices used for the purpose of securely holding the end of a stovepipe in its place after it has been inserted in the flue-opening of the chimney; and it consists in the several details of construction, substantially as shown in the drawings and hereinafter described and claimed.

In the accompanying drawings, A represents a split collar, which is provided upon its outer rim $a$ with lugs $b$, through which passes a tightening-screw $c$, a nut $d$ engaging with the screw-threaded end thereof. This split collar, with its screw and nut, enables it to be tightly drawn around the end of the stovepipe, or that portion in proximity to the flue-opening, as shown in Fig. 2.

Connected to the rim of the collar or any portion thereof found most desirable are arms B, said arms being diametrically opposite each other and of sufficient length to extend into the flue-opening. These arms, as shown in Figs. 1 and 2, are provided at or near their ends with brackets C, in which are pivoted cam-grips D, which have suitable handles $e$ for operating them, so as to hold in their adjusted position clamp-rods E. The rods E are bent at right angles at one end, as shown at $f$, and the opposite ends are bent, as shown at $g$, in opposite directions to that of the bend $f$, which forms a thumb-piece to take hold of in sliding the clamp-rod in or out to adjust the rod in connecting the device to the flue-opening of the chimney.

In operation the arms, with the clamp-rods, are pressed slightly inward and thrust through the flue-opening, said rods being then drawn back by taking hold of the bent end of the rods, which forms the thumb-piece, until the clamps $f$ catch the brick on the inside of the chimney, and the rods are then securely fastened in their adjusted position by means of the grip-cams. The ends of the rods which form the clamps are bent at a little more than a right angle in order that the spring thus obtained will hold the collar firmly against the wall or face of the chimney, upon the outside thereof. After securing the clamp-rods in place, as above described, the collar is spread slightly apart and the end of the stovepipe is pushed through into the flue-opening, the arms B in the meanwhile acting as guides to assist in entering the end of the stovepipe into place. Instead of pressing inward the arms which carry the clamp-rods to enter them through the flue-opening the rods may be turned one-quarter around to bring the bent ends, which form the clamps, on a line within the flue-opening. After the stovepipe is in place the collar is drawn tightly around it by means of the screw and nut hereinbefore described, which firmly retains it in position.

Any tendency the clamps on the ends of the rods may have to let go their hold and spring inward is prevented by the stovepipe, which holds them firmly over to their places after said stovepipe has been pushed in.

The light tie-wire at the top of the collar, as shown at G, which may be fastened thereto in any desirable manner, can be extended back along the top of the pipe and fastened at the elbow, thus securing any number of joints together.

The device herein described prevents a stovepipe from being jarred or knocked out of the flue-opening, and also prevents a loose pipe from slipping in too far and shutting off the draft, and also prevents any side wabble of the pipe.

Having now fully described the invention, what we claim as new, and desire to secure by Letters Patent, is—

The combination, with a split collar for stovepipes and means for drawing said collar tightly around the pipe, of extended arms provided with suitable brackets at or near their ends and grip-cams pivoted thereto, and clamp-rods bodily movable and held in their adjusted position by said cams, substantially as and for the purpose described.

In testimony that we claim the above we have hereunto subscribed our names in the presence of two witnesses.

ARTHUR DAVID GRUBB.
CHARLES JONAS GRUBB.

Witnesses:
J. L. MILLER,
H. WAGGONNER.